United States Patent [19]

Shigematsu et al.

[11] Patent Number: 5,136,670
[45] Date of Patent: Aug. 4, 1992

[54] METHOD FOR OPTICAL SWITCHING AND AN OPTICAL SWITCH

[75] Inventors: Masayuki Shigematsu; Kohji Nakazato, both of Yokohama, Japan

[73] Assignee: Sumitomo Electric Industries, Ltd., Osaka, Japan

[21] Appl. No.: 656,869

[22] Filed: Feb. 19, 1991

[30] Foreign Application Priority Data

Feb. 16, 1990 [JP] Japan .................................. 2-35874

[51] Int. Cl.⁵ .............................................. G02B 6/26
[52] U.S. Cl. .......................................... 385/42; 372/6; 385/16; 385/43; 385/50
[58] Field of Search ............... 350/96.15, 96.16, 96.13, 350/96.14; 372/6; 385/22, 27, 30, 39, 42, 43, 46, 50, 122

[56] References Cited

U.S. PATENT DOCUMENTS

| | | | |
|---|---|---|---|
| 4,515,431 | 5/1985 | Shaw et al. | 350/96.15 |
| 4,546,476 | 10/1985 | Shaw et al. | 372/6 |
| 4,674,830 | 6/1987 | Shaw et al. | 350/96.15 |
| 4,938,561 | 7/1990 | Grasso et al. | 350/96.15 X |
| 4,962,987 | 10/1990 | Doran | 385/122 X |
| 4,995,690 | 2/1991 | Islam | 350/96.15 |

*Primary Examiner*—John D. Lee
*Attorney, Agent, or Firm*—Cushman, Darby & Cushman

[57] ABSTRACT

A method for optical switching using an optical directional coupler. In a first step, excitation light is supplied to an interaction region of the coupler having input and output ports. The interaction region is doped with an active ion having the capability for optical amplification. In a second step, signal light is inputted to one of the input ports and amplified in the interaction region. In a third step, the signal light is outputted from one of the output ports depending on whether saturation of optical gain takes place or not.

24 Claims, 4 Drawing Sheets

METHOD FOR OPTICAL SWITCHING AND AN OPTICAL SWITCH

BACKGROUND OF THE INVENTION

1. Field of the Invention

This invention relates to an optical switch comprising a directional coupler doped with an active ion and a method for optical switching using the same.

2. Related Background Art

Recently, many types of optical switches formed of various directional couplers have been proposed. For example, the possibility of optical switching by gain saturation-induced phase shift in semiconductor directional couplers was reported by J. M. Liu and C. Yeh (Appl. Phys. Lett. 50(23), Jun. 8, 1987.). According to their report, in a semiconductor directional coupler with optical gain, the refractive index in its semiconductor waveguides change with light injection at intensities close to the saturation intensity due to light-induced changes in the carrier density. This change in the refractive index is expected to induce the optical switching in the directional coupler.

However, even the possibility of optical switching by gain saturation-induced phase shift in optical directional couplers which are doped with rare earth ions having capability for optical amplification has not yet been reported.

SUMMARY OF THE INVENTION

As active elements having the capability for optical amplification, rare earth elements, such as Er (erbium), Nd (neodymium), etc., and transition metals are known. In a silica-based optical fiber doped with an active ion, e.g., $Er^{3+}$, when excitation light of a wavelength of 1.49 $\mu$m, is introduced in its core, an inverted population of the active ion takes place, which does the function of amplifying signal light of a wavelength of, e.g., 1.55 $\mu$m.

When the intensity of this signal light introduced in the core exceeds a certain level, so-called gain saturation takes place, and a remarkable decrease in the gain coefficient of the optical amplification is observed. This has been reported by E. Desurvire, C. R. Giles, J. R. Simpson, and J. L. Zyskind (CLEO PD 20-1 (1989)). This Phenomenon is recognized as follows: In the presence of strong signal light, an amount N of the inverted population generated in the core medium becomes smaller than that $N_0$ of the inverted population in the absence of the strong signal light. In response to the decrease of N, the gain coefficient of the optical amplification also decreases, since the gain coefficient is linearly dependent on N.

In an optical amplifier such as an $Er^{3+}$-doped fiber, the amount N is given by the equation (see, for example, Amnon Yariv "Introduction to Optical Electronics" published by the Holt, Rinehart and Winston, Inc.)

$$N = N_0/\{1 + (I/I_s)\} \qquad (1)$$

where I is the intensity of signal light and $I_s$ is the saturation intensity of the signal light. It is seen from the equation (1) that when the intensity I of the signal light is sufficiently smaller than the saturation intensity $I_s$, the amount N approximates $N_0$, and it is also seen that as I comes nearer $I_s$, the denominator becomes larger, accordingly N as well becoming smaller, and the gain coefficient decreases.

On the other hand, the refractive index of a transmitting or propagating medium is generally represented by a complex number and expressed by $\bar{n}$ $$\bar{n} = n + ik \qquad (2)$$

The real part n of the equation (2) is called refractive index in the usual meaning, and imaginary part k is called extinction coefficient. The coefficient k indicates a loss of the transmitting medium.

Accordingly, a transmitting medium having the capability for optical amplification at a certain wavelength, such as the $Er^{3+}$-doped fiber, has a negative value of k at this wavelength. If the intensity of signal light introduced in such a transmitting medium exceeds a certain level, the gain saturation takes place. In this situation, when the intensity of the signal light changes under the condition that the intensity of introduced excitation light is constant, the gain coefficient of the medium will change in accordance with the intensity of the signal light and the extinction coefficient of the medium will also change. Based on these phenomena, the inventor investigated the possibility of optical switching in directional couplers doped with active ions having the capability for optical amplification. As a result, the inventor observed the optical switching caused by gain saturation-induced phase shift generated in such directional couplers.

A method for optical switching according to the present invention comprises the following steps: In a first step, excitation light is supplied to a portion of an interaction region of a directional coupler having input and output ports. The portion is doped with an active ion having the capability for optical amplification. In a second step, signal light is inputted to one of the input ports. In a third step, the signal light is outputted from one of the output ports in accordance with the interrelationship between the degrees of intensity of the signal light and the excitation light.

In this method, the active ion doped in the potion of the interaction region is excited by the excitation light having a predetermined wavelength, and the inverted population of the active ion takes place. Under supply of the excitation light, when signal light of a longer wavelength than the excitation light is inputted to one of the input ports and introduced into the interaction region, the stimulated transition of the active ion arises, and stimulated light is emitted from the active ion. This stimulated light enables the optical amplification of the signal light.

At low signal light intensity, the gain coefficient of the optical amplification is a function of the excitation light intensity only. By keeping the excitation light intensity but increasing the signal light intensity so that the signal light intensity $I_s$ approximates to the saturation intensity $I_s$, the amount of the inverted population decreases in accordance with the equation (1). Corresponding to the decrease of the inverted population, the saturation of optical gain, that is, the decrease in the gain coefficient takes place. The decrease of the gain coefficient, or the decrease of the imaginary part k of the refractive index caused by the increased light signal, leads to an increase or decrease in the real part n of the refractive index in accordance with the Kramers-Kronig relations. The change in n gives a phase shift in the transmitting guide of the directional coupler, and consequently the transmitting path in the directional coupler is switched. This switching of the transmitting path may be also accomplished by keeping the signal light intensity but increasing the excitation light intensity. Accordingly, the signal light inputted to one of the input port is outputted from one of the output ports when the optical gain is unsaturated. Alternatively, the signal light is outputted from another of the output ports when the optical gain is sufficiently saturated. The condition whether gain saturation takes place or not is due to the interrelationship between the degrees of intensity of the excitation light and the signal light.

The above-described directional coupler can be formed by doping a portion of an interaction region formed in a conventional-type directional coupler with the active ion such as $Er^{3+}$. Such a conventional-type coupler may be a fiber coupler, e.g., a fiber array, a bunch fiber, a fused biconical taper coupler, and a coupler of the polished fiber design (see, for example, S. E. Miller and I. P. Kaminow "Optical Fiber Telecommunications II" published by the Academic Press). A planar type directional coupler, e.g., a Ti-diffused lithium niobate ($Ti:LiNO_3$) directional coupler, and a semiconductor directional coupler are also applicable.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
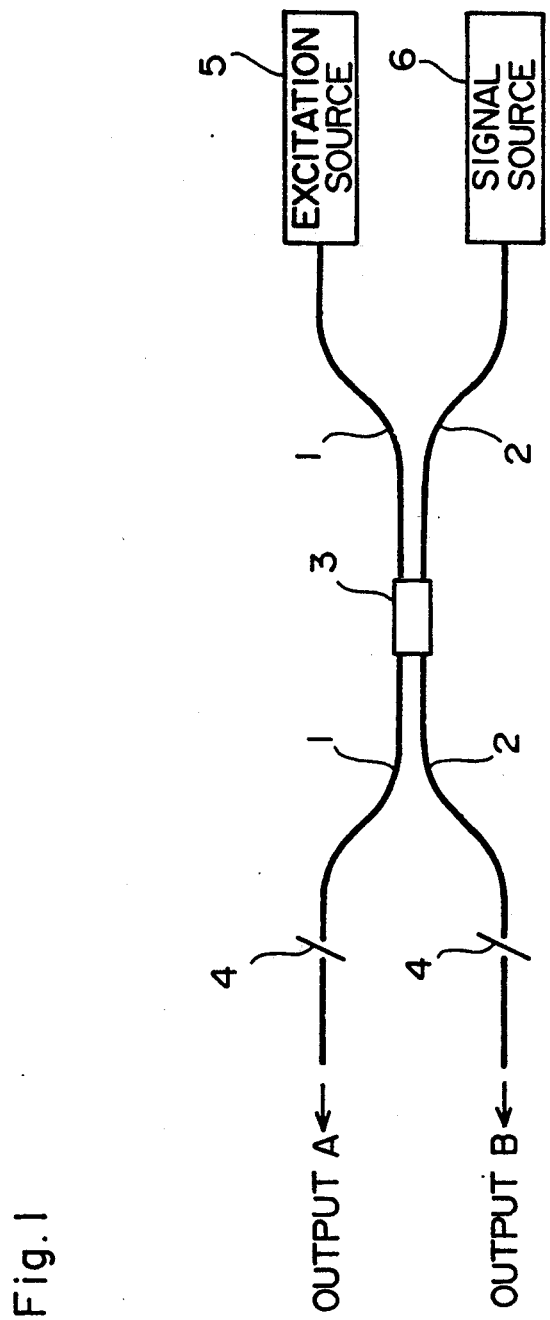
FIG. 1 is a schematic block diagram of an optical switch according to a first embodiment of the present invention.

The drawings will be described below in detail. In the drawings, like reference characters denote like parts in the various views.

Referring first to FIG. 1, a first optical fiber 1 and a second optical fiber 2 are connected to each other at the intermediate portions thereof by an optical directional coupler 3. The first and second fibers 1, 2 are made of single-mode fibers and have the respective cores doped with an active ion. Filters 4 are disposed on the output sides of the first and the second optical fibers 1, 2 for cutting excitation light. While the excitation light from an excitation source 5 is supplied to the input port of the first fiber 1, signal light from a signal source 6 is supplied to the input port of the second fiber 2. The excitation source 5 comprises a color center laser operating at 1.49 μm pump wavelength and 100 mW pump power, and the signal source 6 comprises a semiconductor laser operating at 1.535 μm.

Figure 2:
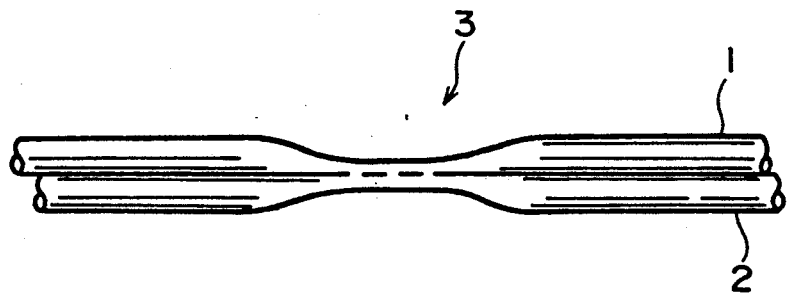
FIG. 2 shows a perspective view of an optical directional coupler used in the device of FIG. 1.

Referring to FIG. 2, the coupler 3 is a type of fused biconical taper coupler, which is made of the first and the second fibers 1, 2 by pressing and fusing these fibers, and then stretching them so that the fused region is drown down to a smaller diameter. The resulting length of the interaction region of the coupler 3 is about 10 cm long. Each of the fibers 1, 2 has $GeO_2$-$SiO_2$ core doped with about 1 weight percent erbium ion ($Er^{3+}$) and about 5 weight percent aluminum ion ($A^{3+}$) and fluoride doped cladding.

The operation of the optical switch is as follows. The excitation light launched into the input port of the fiber 1 pumps the doped erbium. The signal light then launched into the input port of the fiber 2. This signal light stimulates the doped erbium located in the interaction region of the coupler 3 to emit amplified signal light. When the intensity of the signal light launched into the fiber 1 is low level, no gain saturation takes place, and the refractive index does not change in the coupler 3. Accordingly, the amplified signal light is taken out as an output B from the output port of the fiber 2, since the interaction length is an even multiple of the coupling length. As for the optical gain of the output B, for example, a gain of 3 dB is obtained for an input signal power of −30 dBm. In contrast to this, when the intensity of the launched signal light is high level, a gain saturation takes place, and the refractive index of the interaction region in the coupler 3 changes depending on the Krmaers-Kronig relations. Accordingly, the amplified signal light is taken out as an output A from the output port of the fiber 1. As for the optical gain of the output A, for example, a gain of 0.5 dB is obtained for an input signal power of 0 dBm.

Thus, the device of FIG. 2 make it possible to switch the signal light to a different output port to output the same therefrom, based on the interrelationship between the degrees of launched power of the excitation light and the signal light, the density of the doped erbium, the interaction length and so on.

Figure 3:
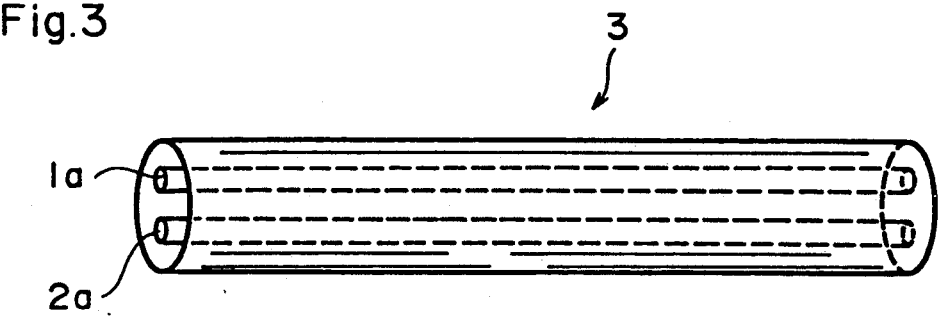
FIG. 3 shows a perspective view of another optical directional coupler applicable to the device of FIG. 1.
Figure 4:
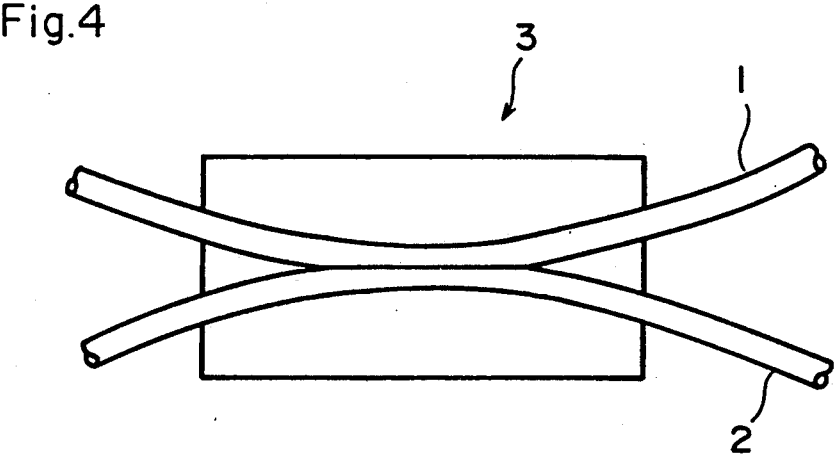
FIG. 4 shows a perspective view of another optical directional coupler applicable to the device of FIG. 1.
Figure 5:
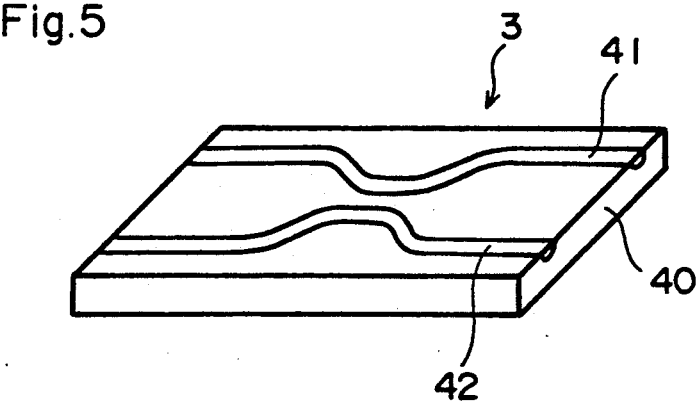
FIG. 5 shows a perspective view of another optical directional coupler applicable to the device of FIG. 1.

FIG. 3 shows an example of the optical directional coupler 3 applicable to the optical switch of FIG. 1. This coupler is a bunch fiber-type directional coupler having an integrated cladding. In this type of coupler, two cores 1a, 2a correspond respectively to the first optical fiber 1 and the second optical fiber 2. FIG. 4 shows another example of the optical directional coupler 3 applicable to the optical switch of FIG. 1. This type of coupler is made of the first and the second fibers 1, 2 by polishing potions of the respective clades until both cores doped with an active ion are very close to the surface. The polished potions of the fibers 1, 2 are then placed together with the fiber cores parallel to each other. FIG. 5 shows a planar-type optical directional coupler 3 using not optical fibers but optical waveguides. Optical waveguides 41, 42 of this coupler 3 are formed by diffusing Ti in predetermined regions of a $LiNO_3$ substrate 41. Subsequently, erbium is doped in the Ti-diffused region using thermal diffusion. As shown in the figure, the waveguides 41, 42 are nearer each other at the intermediate potions to permit optical coupling. In this type of coupler, the optical waveguides 41, 42 correspond respectively to the first and the second optical fibers 1, 2 of FIG. 1.

Figure 6:
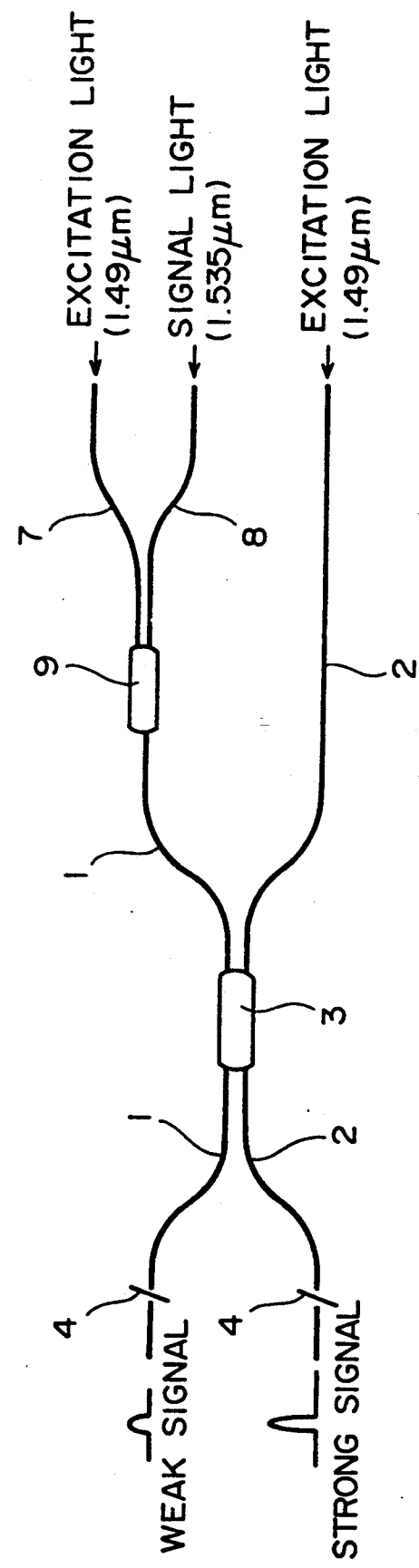
FIG. 6 is a schematic block diagram of an optical switch according to a second embodiment of the present invention.

Referring to FIG. 6, there is shown an optical switch functioning as an intensity filter. In this optical switch, not only signal light but also excitation light is inputted to a first optical fiber 1. That is, an optical fiber 7 connected to a first excitation source and an optical fiber 8 connected to a second excitation source are coupled to the first optical fiber 1 by an optical coupler 9. The signal light is introduced the optical fiber 8, while the excitation light is introduced to the optical fiber 7. The excitation light has wavelength of 1.49 μm, and the signal light has a wavelength of 1.535 μm. It is not necessary to dope the optical fibers 7, 8 especially with active ions. Thus, when the intensity of a signal light is low level, the refractive index does not change in the optical directional coupler 3, and the signal light is outputted as it is from the first optical fiber 1. In contrast to this, the intensity of a signal light is high level, a condition of optical coupling changes, and the signal light is outputted from the second optical fiber 2. An optical switching is thus realized in accordance with an intensity of the signal light.

Figure 7:
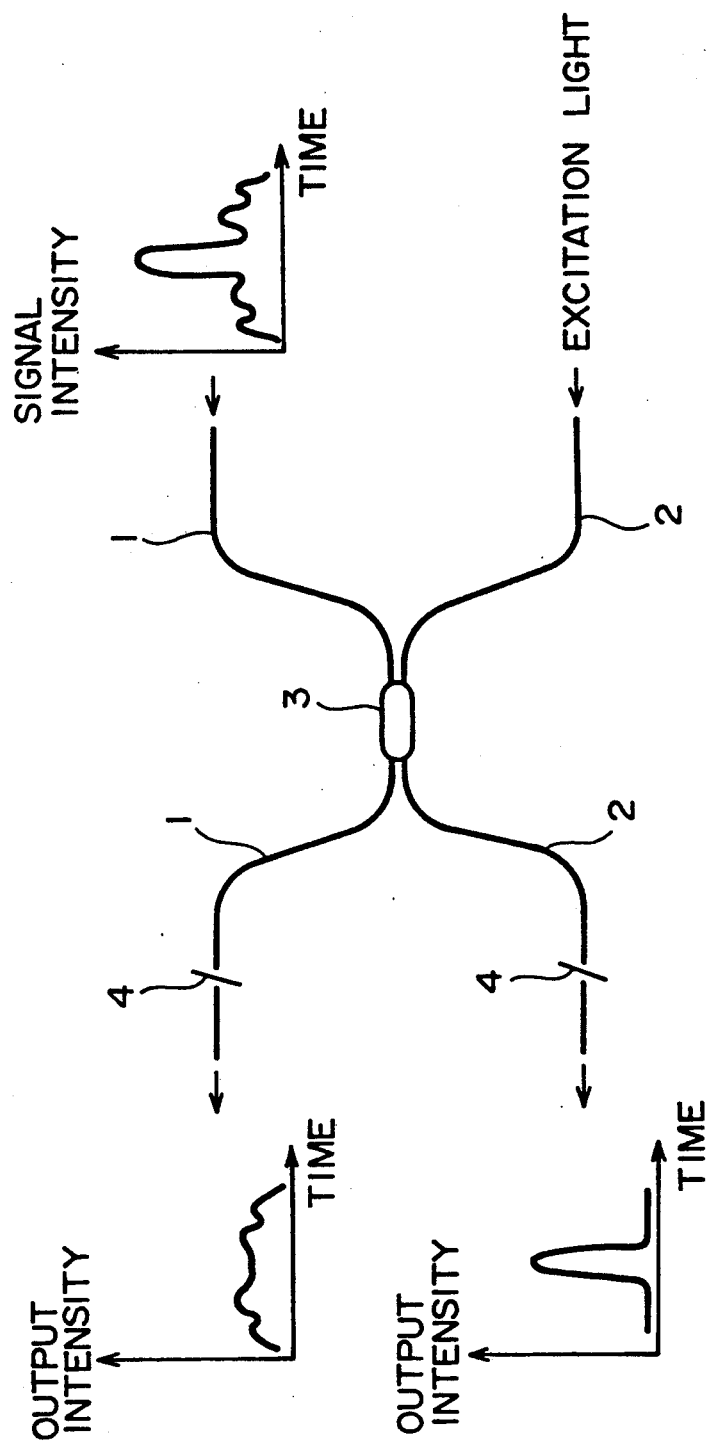
FIG. 7 is a schematic block diagram of an optical switch according to a third embodiment of the present invention.

Referring to FIG. 7, there is shown another optical switch functioning as an intensity filter or a waveform shaper. As shown, a light signal having an unshaped waveform is supplied to the first optical fiber 1, and to the second optical fiber 2 an excitation beam of a constant intensity is supplied. The refractive index changes in the optical directional coupler 3 only when the intensity of the light signal is high level, and a light signal of a shaped waveform is supplied by the second optical fiber 2. The low-level portion of the waveform of the light signal is outputted by the first optical fiber 1.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:
1. An optical directional coupler, comprising:
   an interaction region doped with active ion for optical amplification;
   at least one input port connected to said interaction region for inputting a signal light and an excitation light; and
   at least first and second output ports connected to said interaction region, the interaction region causing signal light incident to be conducted to said first or second output port based on gain saturation of optical amplification of the signal light, said gain saturation based on an interrelationship between the intensities of said excitation light and said signal light.
2. The optical directional coupler according to claim 1, wherein the excitation light incident to the interaction region has a predetermined intensity causing inverted population of said active ion which effects the gain saturation of the optical amplification of the signal light.
3. The optical directional coupler according to claim 2, wherein gain saturation of the optical amplification of the signal light occurs at a threshold degree of the intensity of the signal light incident to the interaction region.
4. The optical directional coupler according to claim 1, wherein the signal light incident to the interaction region has a predetermined intensity causing inverted population of said active ion which effects the gain saturation of the optical amplification of the signal light.
5. The optical directional coupler according to claim 4, wherein gain saturation of the optical amplification of the signal light occurs at a threshold degree of the intensity of the excitation light incident to the interaction region.
6. The optical directional coupler according to claim 1, wherein the interaction region comprises a plurality of optical transmitting guides disposed adjacent to each other, and at least one of the transmitting guides is doped with said active ion.
7. The optical directional coupler according to claim 1, wherein the interaction region comprises a plurality of optical fibers disposed adjacent to each other, each optical fiber comprising a core and a cladding, and at least one of the cores of the optical fibers is doped with said active ion.
8. The optical directional coupler according to claim 7, wherein a portion of the claddings of the optical fibers are partially removed and the exposed portions of the cores are aligned parallel, facing each other and close together.
9. The optical directional coupler according to claim 1, wherein the interaction region comprises a plurality of planar type waveguides disposed adjacent to each other and at least one of the waveguides is doped with said active ion.
10. A fused biconical optical directional coupler comprising:
    an interaction region comprising a plurality of optical fibers disposed adjacent to each other, each optical fiber comprising a cladding and a core, at least one core is doped with active ion for optical amplification;
    at least one input port connected to said interaction region for inputting a signal light and an excitation light; and
    at least first and second output ports connected to said interaction region, the interaction region causing signal light incident to be conducted to said first or second output port based on an interrelationship between the intensities of said excitation light and said signal light.
11. An optical directional coupler comprising:
    an interaction region comprising a plurality of optical fibers disposed adjacent to each other, each optical fiber comprising a cladding and a core, the surrounding region of at least one optical fiber is doped with active ion for optical amplification;
    at least one input port connected to said interaction region for inputting a signal light and an excitation light; and
    at least first and second output ports connected to said interaction region, the interaction region causing signal light incident to be conducted to said first or second output port based on an interrelationship between the intensities of said excitation light and said signal light.
12. An optical directional coupler comprising:
    an interaction region comprising a plurality of planar type waveguides disposed adjacent to each other, the surrounding region of at least one waveguide is doped with active ion for optical amplification;

at least one input port connected to said interaction region for inputting a signal light and an excitation light; and at least first and second output ports connected to said interaction region, the interaction region causing signal light incident to be conducted to said first or second output port based on an interrelationship between the intensities of said excitation light and said signal light.

13. A method for performing optical switching in an optical directional coupler having an interaction region doped with active ion for optical amplification, at least one input port connected to said interaction region, and at least first and second output ports connected to said interaction region, comprising:

transmitting a signal light to said at least one input port;

transmitting an excitation light to said at least one input port;

if the signal light intensity and the excitation light intensity incident to said interaction region are less than a second predetermined intensity, the signal light is outputted through said first output port; and if at least one of the signal light intensity and the excitation light intensity incident to said interaction region is greater than said second predetermined intensity, gain saturation of optical amplification of the signal light occurs wherein the signal light is outputted through said second output port.

14. The method for performing optical switching according to claim 13, wherein the excitation light incident to the interaction region has a predetermined intensity causing inverted population of said active ion which effects the gain saturation of the optical amplification of the signal light.

15. The method of performing optical switching according to claim 14, wherein if the signal light intensity incident to the interaction region is greater than said second predetermined intensity, the gain saturation of the optical amplification of the signal light occurs.

16. The method of performing optical switching according to claim 13, wherein the signal light incident to the interaction region has a predetermined intensity causing inverted population of said active ion which effects the gain saturation of the optical amplification of the signal light.

17. The method of performing optical switching according to claim 16, wherein if the excitation light intensity incident to the interaction region is greater than said second predetermined intensity, the gain saturation of the optical amplification of the signal light occurs.

18. The method of performing optical switching according to claim 13, wherein the interaction region comprises a plurality of optical transmitting guides disposed adjacent to each other, and at least one of the transmitting guides is doped with said active ion.

19. The method of performing optical switching according to claim 13, wherein the interaction region comprises a plurality of optical fibers disposed adjacent to each other, each optical fiber comprising a core and a cladding, and at least one of the cores of the optical fibers is doped with said active ion.

20. The method of performing optical switching according to claim 19, wherein a portion of the claddings of the optical fibers are partially removed and the exposed portions of the cores are aligned parallel, facing each other and close together.

21. The method of performing optical switching according to claim 13, wherein the interaction region comprises a plurality of planar type waveguides disposed adjacent to each other and at least one of the waveguides is doped with said active ion.

22. A method for performing optical switching in a fused biconical optical directional coupler having an interaction region comprising a plurality of optical fibers disposed adjacent to each other, each optical fiber comprising a cladding and a core, at least one core is doped with active ion for optical amplification, at least one input port connected to said interaction region, and at least first and second output ports connected to said interaction region, comprising:

transmitting a signal light to said at least one input port;

transmitting an excitation light to said at least one input port;

if the signal light intensity and the excitation light intensity incident to said interaction region are less than a second predetermined intensity, the signal light is outputted through said first output port; and if at least one of the signal light intensity and the excitation light intensity incident to said interaction region is greater than a second predetermined intensity, the signal light is outputted through said second output port.

23. A method for performing optical switching in an optical directional coupler having an interaction region comprising a plurality of optical fibers disposed adjacent to each other, each optical fiber comprising a cladding and a core, the surrounding region of at least one core is doped with active ion for optical amplification, at least one input port connected to said interaction region, and at least first and second output ports connected to said interaction region, comprising:

transmitting a signal light to said at least one input port;

transmitting an excitation light to said at least one input port;

if the signal light intensity and the excitation light intensity incident to said interaction region are less than a second predetermined intensity, the signal light is outputted through said first output port; and if at least one of the signal light intensity and the excitation light intensity incident to said interaction region is greater than a second predetermined intensity, the signal light is outputted through said second output port.

24. A method for performing optical switching in an optical directional coupler having an interaction region comprising a plurality of planar type waveguides disposed adjacent to each other, the surrounding region of at least one waveguide is doped with active ion for optical amplification, at least one input port connected to said interaction region, and at least first and second output ports connected to said interaction region, comprising:

transmitting a signal light to said at least one input port;

transmitting an excitation light to said at least one input port;

if the signal light intensity and the excitation light intensity incident to said interaction region are less than a second predetermined intensity, the signal light is outputted through said first output port; and if at least one of the signal light intensity and the excitation light intensity incident to said interaction region is greater than a second predetermined intensity, the signal light is outputted through said second output port.

* * * * *